US006760496B2

(12) United States Patent
Hammer

(10) Patent No.: US 6,760,496 B2
(45) Date of Patent: Jul. 6, 2004

(54) INLINE FERROMAGNETIC-COMPOSITE ISOLATOR AND METHOD

(75) Inventor: Jacob M. Hammer, Annapolis, MD (US)

(73) Assignee: Photodigm, Inc., Richardson, TX (US)

( * ) Notice: Subject to any disclaimer, the term of this patent is extended or adjusted under 35 U.S.C. 154(b) by 0 days.

(21) Appl. No.: 10/347,089

(22) Filed: Jan. 17, 2003

(65) Prior Publication Data

US 2003/0147579 A1 Aug. 7, 2003

Related U.S. Application Data

(60) Provisional application No. 60/353,548, filed on Jan. 31, 2002.

(51) Int. Cl.[7] .............................. G02B 6/00; G02B 6/10
(52) U.S. Cl. ......................... 385/11; 385/129; 385/131
(58) Field of Search .......................... 385/11, 129, 130, 385/131

(56) References Cited

U.S. PATENT DOCUMENTS

| | | | |
|---|---|---|---|
| 4,721,352 A | * | 1/1988 | Sorin et al. ................... 385/11 |
| 5,408,565 A | * | 4/1995 | Levy et al. .................. 385/130 |
| 5,598,492 A | | 1/1997 | Hammer ....................... 385/27 |
| 5,760,946 A | | 6/1998 | Yokoi et al. ................. 359/281 |
| 6,169,825 B1 | | 1/2001 | Morey et al. .................. 385/11 |
| 6,208,795 B1 | * | 3/2001 | Nakano et al. ............. 385/131 |
| 6,507,249 B1 | * | 1/2003 | Schloemann ................ 333/1.1 |

OTHER PUBLICATIONS

Zaets, Wadim et al., "*Optical Waveguide Isolator Based on Nonreciprocal Loss/Gain of Amplifier Covered by Ferromagnetic Layer*" Article from IEEE Photonics Technology Letters, vol. 11, No. 8, Aug. 1999, 3 pgs.

Okamura, Yasuyuki et al. "*Integrated Optical Isolator and Circulator Using Nonreciprocal Phase Shifters: A Proposal*" Article from Applied Optics, vol. 23, No. 11, Jun. 1984, 4 pgs.

Shimizu, H. et al. "*Design of Semiconductor–Waveguide–Type Optical Isolators Using the Nonreciprocal Loss/Gain in the Magneto–Optical Waveguides Having MnAs Nanoclusters*" Article from Applied Physics Letters, vol. 81, No. 27, Dec. 30, 2002, 3 pgs.

(List continued on next page.)

*Primary Examiner*—John D. Lee
*Assistant Examiner*—Tina M Lin
(74) *Attorney, Agent, or Firm*—Duke W. Yee; Patrick C. R. Holmes

(57) ABSTRACT

An exemplary optical isolator, which may use a magnetic-composite material made of a ferromagnetic-composite, and method for making the same are provided. The optical isolator may include a core, a cladding, and a magnetic-composite material. The core is operable to allow a light wave incident a first end to propagate to a second end to define a positive propagation direction, and to allow a light wave incident the second end to propagate to the first end to define a negative propagation direction. The cladding is positioned relative the core and includes a thinned segment of the cladding with a cladding thickness operable to allow an optical field penetration through the thinned segment of the cladding by a light wave that propagates either in the positive or negative propagation direction. The thinned segment has a length that extends relative to a portion of the core. The magnetic-composite material is provided in the presence of a magnetic field, such as a static magnetic field, in a direction perpendicular to the positive propagation direction of the core, and is positioned relative the thinned segment to receive the optical field penetration through the thinned segment. The magnetic-composite material having a thickness and an index of refraction to attenuate a light wave that propagates in the portion of the core in the negative propagation direction more than the attenuation of a light wave that propagates in the portion of the core in the positive propagation direction.

45 Claims, 1 Drawing Sheet

OTHER PUBLICATIONS

Mizumoto, Tetsuya et al. *"Nonreciprocal Propagation Characteristics of YIG Thin Film"* Article from IEEE Transactions on Microwave Theory and Techniques, vol. MTT–30, No. 6. Jun. 1982, 4 pgs.

Mizumoto, Tetsuya et al. *"Measurement of Optical Nonreciprocal Phase Shift in a Bi–Substituted Gd3Fe5O12 Film and Application to Waveguide–Type Optical Circulator"* Article from Journal of Lightwave Technology, vol. LT–4, No. 3, Mar. 1986, 6 pgs.

Shintaku, Toshihiro *"Integrated Optical Isolator Based on Efficient Nonreciprocal Radiation Mode Conversion"* Article from Applied Physics Letters, vol. 73, No. 14, Oct. 5, 1998, 3 pgs.

Shintaku, Toshihiro et al. *"Optical Waveguide Isolator Based on Nonreciprocal Radiation"* Article from J. Appl. Phys., vol. 76, No. 12, Dec. 15, 1994, 5 pgs.

Shintaku, Toshihiro et al. *"Magneto–Optic Channel Waveguides in Ce–Substituted Yttrium Iron Garnet"* Article from J. Appl. Phys., vol. 74, No. 8, Oct. 15, 1993, 5 pgs.

Bahlmann, Norbett et al. *"Improved Design of Magnetooptic Rib Waveguides for Optical Isolators"* Article from Journal of Lightwave Technology, vol. 16, No. 5, May 1998, 6 pgs.

Fehndrich, M. et al. *"Experimental Investigation of the Nonreciprocal Phase Shift of a Transverse Electric Mode in a Magneto–Optic Rib Waveguide"* Article from Applied Physics Letters, vol. 74, No. 20, May 17, 1999, 3 pgs.

Solymar L. et al. *"Some Travelling–Wave Interactions in Semiconductors Theory and Design Considerations"* Article from Int. J. Electronics, vol. 20, No. 2, 1966, 22 pgs.

* cited by examiner

INLINE FERROMAGNETIC-COMPOSITE ISOLATOR AND METHOD

CROSS-REFERENCE TO RELATED APPLICATIONS

Pursuant to 35 U.S.C. §119(e), this application claims the benefit of U.S. Provisional Patent Application Serial No. 60/353,548, entitled Inline Ferromagnetic-Composite Isolator and Method, filed Jan. 31, 2002, and named Jacob M. Hammer as inventor, which is hereby incorporated by reference for all purposes.

TECHNICAL FIELD OF THE INVENTION

This invention relates in general to the field of semiconductor lasers and optical isolators and more particularly to an inline ferromagnetic-composite isolator and method.

BACKGROUND OF THE INVENTION

Optical isolators are used in optical communications systems and optical networks to eliminate or reduce reflected light waves. The presence of reflected light waves in such systems and networks may result in significant problems, disadvantages and instabilities, especially when reflected light waves reach or reenter a laser source or optical amplifier.

Conventional optical isolators were developed to eliminate or minimize the presence of reflected light waves. Unfortunately, the manufacture and implementation of conventional optical isolators is complicated, unreliable, expensive and fraught with difficulties and disadvantages.

The implementation of conventional optical isolators is often cumbersome and expensive. For example, conventional optical isolators may use non-reciprocal Transverse Electric ("TE") like mode converters and non-reciprocal Transverse Magnetic ("TM") like mode converters, reciprocal TE like mode converters and reciprocal TM like mode converters, an absorption element to absorb modes of light of a particular polarization, and a space periodic magnetic field for quasi-phase match between TE and TM like modes. This phase match requirement of conventional optical isolators is particularly difficult and problematic, and imposes severe fabrication tolerances. For example, the fabrication tolerances on such variables as composition, layer thickness, and interaction length are extremely difficult to consistently achieve and replicate. This causes reliability and performance concerns, along with significantly increased overall costs.

The increased use of semiconductor optical elements and devices, such as semiconductor lasers, laser arrays, and optical amplifiers, have resulted in the need to integrate or interface conventional optical isolators with such semiconductor elements and devices. The different fabrication techniques and materials used in each has made such a solution either impossible or impractical. This has provided additional challenges in integrating and interfacing conventional optical isolators with semiconductor elements and devices.

SUMMARY OF THE INVENTION

From the foregoing it may be appreciated that a need has arisen for an inline ferromagnetic-composite isolator and method for use in an optical system or network. In accordance with the present invention, an inline ferromagnetic-composite isolator and method are provided that substantially eliminate one or more of the disadvantages and problems outlined above.

According to an aspect of the present invention, an optical isolator, and method for making the same, is provided that includes a waveguide, with a core and a cladding, and a magnetic-composite material. The waveguide core may include a first end, a second end, and a boundary surface, is operable to allow a light wave incident the first end of the core to propagate from the first end of the core to the second end of the core, which defines a positive propagation direction, and is operable to allow a light wave incident the second end of the core to propagate from the second end of the core to the first end of the core, which defines a negative propagation direction. The waveguide cladding is positioned relative the boundary surface of the core and includes a thinned segment of the cladding with a cladding thickness operable to allow an optical field penetration through the thinned segment of the cladding by a light wave that propagates in the positive propagation direction of the core and that propagates in the negative direction of the core. The thinned segment of the cladding having a length that extends relative to a portion of the core. The magnetic-composite material is provided in the presence of a magnetic field, which is preferably a static magnetic field, with at least a component of the magnetic field oriented in a direction perpendicular to the positive propagation direction of the core parallel to the magnetic vector of the optical field, and is positioned relative the thinned segment of the cladding of the waveguide to receive the optical field penetration through the thinned segment of the cladding. The magnetic-composite material having a thickness and an index of refraction to attenuate a light wave that propagates in the portion of the core in the negative propagation direction by an amount greater than the attenuation of a light wave that propagates in the portion of the core in the positive propagation direction.

According to an aspect of the present invention, an optical isolator, and method for making the same, is provided that includes a waveguide with a guide layer, a first clad layer, a second clad layer, and a magnetic-composite material. The waveguide guide layer may include a first end, a second end, a top and a bottom, is operable to allow a light wave incident the first end of the guide layer to propagate from the first end of the guide layer to the second end of the guide layer, which defines a positive propagation direction, and is operable to allow a light wave incident the second end of the guide layer to propagate from the second end of the guide layer to the first end of the guide layer, which defines a negative propagation direction. The first clad layer of the waveguide is provided relative the bottom of the guide layer, and the second clad layer of the waveguide is provided relative the top of the guide layer. The second clad layer includes a thinned segment with a thickness operable to allow an optical field penetration through the thinned segment of the second clad layer by a light wave that propagates in the positive propagation direction of the guide layer and that propagates in the negative direction of the guide layer. The thinned segment of the second clad layer having a length that extends relative to a portion of the guide layer. The magnetic-composite material is provided in the presence of a magnetic field with at least a component of the magnetic field oriented in a direction perpendicular to the positive propagation direction of the guide layer parallel to the magnetic vector of the optical field, and is positioned relative the thinned segment of the second clad layer of the waveguide to receive the optical field penetration through the thinned segment of the second clad layer. The magnetic-composite material having a thickness and an index of refraction to attenuate a light wave that propagates in the portion of the guide layer in the negative propagation direction by an amount greater than the attenuation of a light wave that propagates in the portion of the guide layer in the positive propagation direction.

Related aspects of the optical isolator of the present invention may include providing the thickness of the magnetic-composite material at an optimal thickness defined by such variables as (i) the thickness where maximum attenuation occurs of a light wave of a known frequency that propagates in the portion of the core in the negative propagation direction, (ii) the thickness where minimum attenuation occurs of a light wave of a known frequency that propagates in the portion of the core in the positive propagation direction, and/or (iii) the thickness where the maximum isolation-to-loss ratio occurs, where the isolation is defined as the attenuation of a light wave of a known frequency that propagates in the portion of the core or guide layer in the negative propagation direction, and the loss is defined as the attenuation of a light wave of a known frequency that propagates in the portion of the core or guide layer in the positive propagation direction. Additional related aspects of the optical isolator of the present invention may include providing the thickness of the magnetic-composite material at a thickness defined by such variables as (i) the thickness that results in a larger optical intensity of the optical field of the light wave of a known frequency that propagates in the portion of the core or guide layer in the negative propagation direction to penetrate the thinned segment of the cladding (or second clad layer) to propagate in the magnetic-composite material, than the optical intensity of the optical field of the light wave of a known frequency that propagates in the portion of the core or guide layer in the positive propagation direction to penetrate the thinned segment of the cladding (or second clad layer) to propagate in the magnetic-composite material.

Other aspects of the optical isolator of the present invention may include a maximum isolation-to-loss ratio that is greater than ten, the magnetic-composite material is made of such materials as (i) a polymer and magnetic particles, (ii) a transparent polymer and magnetic particles, (iii) plastic and ferromagnetic particles such as iron or some other metal, (iv) magnetic particles dispersed throughout a polymer, where the magnetic particles are nanometer sized particles. Another aspect of the present invention may include an index of refraction of the polymer that is equal to or greater than the index of refraction of the clad layer of the waveguide.

Still other aspects of the present invention may include the optical isolator provided inline with an optical fiber, the core of the optical isolator is in communication with a core of the optical fiber, and the cladding of the optical isolator is in communication with a cladding of the optical fiber. Another aspect of the present invention may include the optical isolator that has been monolithically integrated with an optical fiber.

Yet another aspect of the present invention may include the optical isolator that defines the length of the thinned segment of the cladding (or second clad layer) as the length to ensure that a light wave that propagates in the portion of the core or guide layer in the negative propagation direction is attenuated by an amount greater than the attenuation of a light wave that propagates in the portion of the core or guide layer in the positive propagation direction.

The various embodiments and implementations of the present invention provide a profusion of potential technical advantages. A technical advantage of the present invention includes the capability to accurately and inexpensively, especially when compared to conventional optical isolators, fabricate and implement an inline ferromagnetic-composite isolator that provides excellent optical isolation properties.

Another technical advantage of the present invention includes the capability to use existing and available manufacturing techniques and processes, including, for example, conventional semiconductor fabrication processes, to fabricate and implement certain embodiments of the invention. This further reduces overall costs to implement and practice the present invention.

Another technical advantage of the present invention includes the capability to reliably and accurately manufacture optical isolators that provide known and pre-determined optical isolation properties. This increases overall reliability and efficiency.

Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementation illustrated and described herein.

Figure 1:
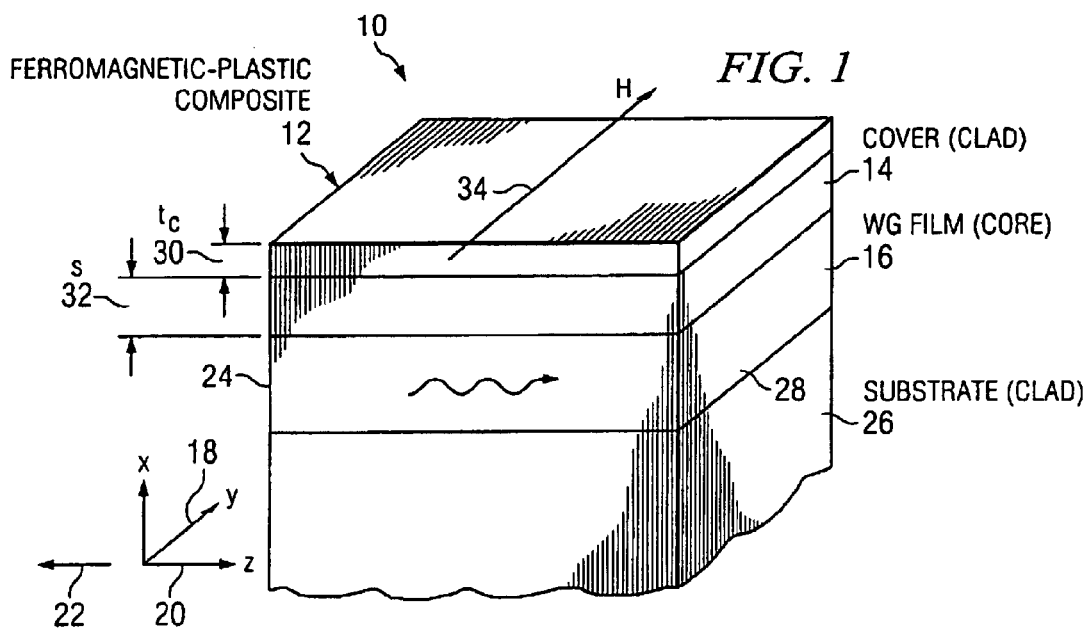
FIG. 1 is a perspective view of an optical isolator that illustrates a plurality of layers constructed or fabricated in accordance with an embodiment of the present invention.

FIG. 1 is a perspective view of an optical isolator 10 that illustrates a plurality of layers fabricated in accordance with an embodiment of the present invention. The optical isolator 10 includes a cladding or first clad layer 26, a guide layer 16, which may also be referred to as a core, a thinned segment 14 of a second clad layer, and a magnetic-composite material, such as a Ferromagnetic Particle Plastic Composite or Ferromagnetic Plastic Composite ("FPC") layer 12, provided in the presence of a magnetic field, such as the static magnetic field 34 oriented as shown along a positive y axis 18. The combination of the first clad layer 26, the thinned segment 14 of the second clad layer, and the guide layer 16 serve as a waveguide to allow light to propagate through the guide layer 16, which may be implemented as an optical or transparent film. The combination of the effects of the FPC layer 12, which has the correct thickness, and the static magnetic field 34, as they act on light waves in the guide layer 16 through the thinned segment 14, provide the desired optical isolation with the desired properties as provided by the present invention.

In one embodiment, the optical isolator 10 may be provided with or integrated as part of a fiber optic line or optical fiber. In another embodiment, the optical isolator 10 may be monolithically integrated with a variety of material systems and structures including an optical fiber.

The optical isolator 10 may be implemented inline with a light source, such as a semiconductor laser not shown in FIG. 1, to provide optical isolation. For example, a light wave provided from a light source may contact the guide layer 16, which also may be referred to as a core, incident a first end 24 and propagate through the guide layer 16 until the light wave reaches a second end 28. This direction of propagation may be defined as a positive propagation direction along the positive z axis 20 as shown. A light wave, such as a reflected light wave, may contact the guide layer 16 incident the second end 28 and propagate through the guide layer 16 until the light wave reaches the first end 24. This direction of propagation may be defined as a negative propagation direction along the negative z axis 22 as shown. The optical isolator 10, as will be explained below, attenuates the reflected light wave that propagates in the negative propagation direction along the negative z axis 22 to provide the desired optical isolation, while minimally affecting the light wave that propagates in the positive propagation direction along the positive z axis 20.

The FPC layer 12 may be implemented using, in one embodiment, a transparent plastic or polymer with magnetic particles dispersed within. In one embodiment the magnet particles are nanometer sized iron particles. The FPC layer 12 of the optical isolator 10 is provided at a desired position relative to the top of the thinned segment 14, at a desired thickness 30, and at a desired complex index of refraction to produce the needed optical isolation of light waves propagating in the guide layer 16 in the negative propagation direction, as shown as the negative z axis 22. In another embodiment, the FPC layer 12 may include one or more layers to constitute the overall desired thickness 30 of the FPC layer 12. An optimal or desired thickness 30 of the FPC layer 12 may be selected according to an embodiment of the present invention to provide desired optical isolation properties. The thickness of the thinned segment 14 must be such that the optical field of the light waves propagating through the guide layer 16 can penetrate through the thinned segment 14 and into the FPC layer 12.

The FPC layer 12, in one embodiment, may be deposited on the cover layer or the thinned segment 14, which may also be a thinned cladding of an optical fiber or other device at a thickness 32. As mentioned above, the thickness of the thinned segment 14 is determined or designed to allow for the penetration of the optical field of the guided mode of light waves propagating in both the positive and negative propagation directions through the portion of the guide layer 16 extending relative the thinned segment 14 and into the FPC layer 12, which is provided in the presence of the magnetic field as indicated by the static magnetic field direction 34. At least a component, and preferably the primary component, of the magnetic field needs to be oriented in a direction that is perpendicular to the positive propagation direction, such as the positive y axis 18 which is perpendicular to the positive z axis 20. If the orientation or polarity of the static magnetic field direction 34 is reversed, the optical isolation properties of the present invention as illustrated would operate in reverse. That is the light waves propagating through the guide layer 16 in the positive propagation direction will be attenuated to provide optical isolation in the opposite direction.

One aspect the present invention is directed toward constructing the optical isolator 10 from a variety of materials and determining the range of thickness of the FPC layer 12 to produce desired optical isolation properties in the guide layer 16. The thickness of the FPC layer 12 is chosen according to the teachings of the present invention, and the FPC layer 12 may be readily fabricated by those skilled in the art.

The application of the magnetic field in the lateral direction or along the positive y axis 18 results in non-reciprocal change of the complex propagation constant of the guide mode. The loss for guided light traveling in the guide layer 16 in the positive z axis in the positive propagation direction is different than the loss or attenuation experienced by a light wave traveling in the guide layer 16 in the negative propagation direction along the negative z axis 22.

The FPC layer 12, in a preferred embodiment, includes nanometer-sized ferromagnetic particles suspended in a transparent plastic. The optical loss of such a composite layer, such as the FPC layer 12, containing the same weight of ferromagnetic material as a continuous ferromagnetic layer is reduced while the Faraday rotation remains the same. The composition and thickness of the FPC layer 12 or layers are factors in obtaining isolators with useful isolation-to-loss ratios.

For a given composition and choice of waveguide parameters, the required range of the FPC layer 12 thickness is determined by certain waveguide cutoff conditions. For an FPC layer 12 having a thickness in a given range, the relatively small change in complex refractive index between the positive and negative propagation direction causes the modal field of the waveguide or fiber, such as the guide layer 16, to have a large overlap in the FPC layer 12 in one direction and a much smaller overlap in a reverse direction. This results in a large difference in loss between the two directions resulting in a high isolation ratio and a low insertion loss. The optical intensity of the penetration of the optical field through the thinned segment 14 and into the FPC layer 12 is greater from a light wave propagating through the guide layer 16 in the negative propagation direction than from a light wave propagating through the guide layer 16 in the positive propagation direction. These changes take place when a correctly oriented magnetic field is present. Absent such a field, the overlap and loss do not vary when propagation direction is reversed.

It should be appreciated that the composites may be deposited in the FPC layer 12 by any of a variety of methods including spin coating, dipping, spraying, sputtering and other methods known in the art. The FPC layer 12 can be used with most waveguide and integrated optic material systems. The FPC layer 12 is provided at the desired thickness 30 and may be deposited adjacent the thinned segment 14. The thinned segment 14 is provided with the thickness 32, which, in one embodiment, may correspond to the cladding in an optical fiber, and is adjusted to allow some optical field penetration into the FPC layer 12. The field penetration may be calculated by means well known to those of ordinary skill in the art.

The isolation-to-loss ratio is related to the optical field penetration. The isolation-to-loss ratio is related to the thickness 30 of the FPC layer 12 and may depend on the thickness 32 of the thinned segment 14 as well. It should be appreciated that in some aspects the isolation-to-loss ratio may be a significant parameter as the actual value of isolation may be set by choosing the isolator length or the length of the FPC 12 and thinned segment 14 that corresponds to the guide layer 16. Thus, the optimal or desired thickness of the FPC layer 12 may be chosen, for example, based on the maximum isolation, the minimum loss, and/or the maximum isolation-to-loss ratio.

When a static magnetic field is applied in the lateral direction, or along the positive y axis 18, the loss and effective index for a Transverse Magnetic ("TM") like waveguide modes propagating in the positive propagation direction along the positive z axis 20 is different than for propagation in the negative propagation direction along the negative z axis 22. A similar effect will be encountered for propagation in a single direction when the magnetic field is reversed. The nonreciprocal change is due to the magnetic Kerr effect.

It will be appreciated that the guide layer 16 may be a more complex structure having a plurality of layers and, in such a guide layer 16, the FPC layer 12 may be deposited on a top layer of the guide layer 16. The guide layer 16 may be chosen so that some of the optical field of the waveguide mode penetrates the FPC layer 12. That is a portion or layer of the guide layer 16 may, in effect, serve as the thinned segment 14.

In the presence of a properly oriented magnetic field, the FPC layer 12 has, depending upon the direction of propagation and the field direction, a varying real part (n) and imaginary part (k) of the complex index of refraction. This variation of the complex index of refraction for the optical isolator 10, specifically the FPC layer 12, the thinned segment 14, and the guide layer 16, will have differing fields in the composite depending on the dimensions of the FPC layer 12, the thinned segment 14, and the guide layer 16, as well as their optical properties. Since the complex index of refraction of the composite depends on the direction of propagation, the optical isolator 10 may have different field overlap and loss, for the two possible directions of propagation and isolation.

It should be appreciated that the optical isolator 10 of the present invention is not restricted to a planer geometry, although it may more easily be visualized as such. Furthermore, in some aspects, the present invention does not require an amplifying structure or electrodes and is not restricted to semiconductor waveguides. Furthermore, the specific types of magnetic material formed by a composite of nanometer size magnetic material particles suspended in a medium with a specified refractive index may be necessary in some aspects of the present invention. For example, the index of refraction of the polymer of the magnetic-composite may be equal to or greater than the index of refraction of the core or guide layer 16.

In a layer-like optical waveguide, such as the optical isolator 10, the FPC layer 12 is applied as a top layer whose distance from the guide layer 16 and thickness 30 may be determined by criteria described herein. Such specification of the nature of the composite utilized in the FPC layer 12 as well as its location and dimensions may be necessary to obtain one or more of the advantages described herein according to one aspect of the present invention.

Various example calculations may be made to illustrate certain embodiments and aspects of the present invention.

The cover thickness or the thickness 30 of the thinned cladding of thinned segment 14 is chosen to allow some penetration of the field of the guide mode into the FPC layer 12. The isolation-to-loss ratio depends on the thickness of the one or more layers or FPC layers of the FPC layer 12. This present invention teaches how to construct optical isolators from a variety of materials and how to determine the range of the thickness of the FPC layer 12 to ensure useful devices having desired properties. When the thickness range of the FPC layer 12 is chosen according to the teaching of this invention, the optical isolator 10 can readily be fabricated by present state-of-the-art manufacturing processes.

As mentioned above, the magnetic field 34 applied in the lateral (y) direction results in non-reciprocal change of the complex propagation constant of the guided mode. Thus, the loss for guided light traveling in the direction of the positive z axis 20 is different than the loss in the direction of the negative z axis. This may be contrasted with the "conventional" approach that requires a nonreciprocal TE-TM like mode converter section, a reciprocal TE-TM like mode converter section, a section which preferentially absorbs modes on one polarization, and a space periodic magnetic field for quasi-phase match between TE and TM like modes. The phase match requirement of the conventional approach also imposes severe tolerances on composition, layer thickness, and interaction length that are difficult if not impossible to meet in manufacture. These severe tolerances may explain why there have been no optical waveguide isolators commercially available.

The composition and thickness of the composite layer or layers of the FPC layer 12 are factors in obtaining isolators with useful isolation-to-loss ratios. For a given composition and choice of waveguide parameters the required thickness range of the FPC layer 12 is determined by certain waveguide cutoff conditions, which will be described below.

For the FPC layer 12 with a thickness in the correct range, the relatively small change in complex refractive index between the positive and negative propagation direction causes the modal field of the waveguide or fiber to have a large overlap in the FPC layer 12 in one direction and much smaller overlap in the reverse direction. This in turn results in a large difference in loss between the two directions resulting in a high isolation ratio and low insertion loss.

An example material that may be used in the FPC layer 12 is iron, however, it should be appreciated that a variety of materials and metals may be utilized and are within the scope of the invention. Other ferromagnetic or magnetic materials that provide Faraday rotation and magnetic Kerr effect may be similarly used. Some examples are Ni, Co, also lower loss materials such as Gadolinium Busmuth Iron Oxide, YIG (Yttrium Iron Garnet) and others known in the art.

The use of a polycrystalline/amorphous ferromagnetic layer in FPC layer 12 may achieved by depositing such material using available material systems to provide the non-reciprocal interaction required by true isolators. This was first proposed by the inventor. The high values of the magneto optic effects, e.g., Faraday rotation-Kerr effect, etc., compete with the high loss characteristic of the ferromagnetic material. The loss can be overcome by the high gain of semiconductor junctions or quantum wells but with severe noise, and pump power penalty. Ferromagnetic films consisting of islands with strongly reduced optical losses without substantial reduction in magnetic properties have been reported. These retain the magnetic properties of the continuous films but have optical losses reduced by a factor of thirty. Although these are more encouraging, the loss is still too high for practical use.

The present invention, unlike others, recognizes the importance of the film thickness in forming an isolator on an optical waveguide. Indeed, others have taught away from the present invention through such statements as "[t]he optical losses of Fe and Ni FPC films demonstrated are too high for integrated optical devices, e.g. optical isolators, since Fe and Ni have high losses." Others may have suggested outcomes, such as using lower loss magnetic materials, but others have not recognized or taught how to select the correct thickness of the FPC layer 12 and how this acts to overcome the losses and thus allows the use of the very high Kerr and Faraday effects of the ferromagnetic metals.

The magnetic field, such as the static magnetic field 34, may be provided using available or known techniques. For example, M. Levy et al. describes a thin layer permanent magnet that may be used to provide the static magnetic field 34 in an integrated and compact optical isolator.

To obtain high isolation-to-loss ratios the refractive index of the plastic in which the ferromagnetic particles of the FPC layer 12 are embedded should equal or be greater than the index of the waveguide layer or core. In addition, the thickness must be in the range taught by this invention.

An example, based on the teaching of the present invention, includes the use of iron particles in poly methyl methacrylate ("PMMA") to comprise the FPC layer 12. The refractive index of PMMA is 1.54 at a wavelength of 1.55 µm. The example is FPC-6 shown in Table 1 below. The FPC layer 12 thickness of ≈0.46 gives an improved isolation (≈1.5 dB/cm) to insertion loss (≈1.2 dB/cm) ratio of 12.4. The optical isolator 10 may use a fused quartz type waveguide, such as guide layer 16, with doping similar to that used in optical fibers. The cover or thinned segment 14 is 5 µm thick with refractive index nc=1.447. The substrate refractive index is ns=1.447. The guiding layer 16 is 10 µm thick and has refractive index nf=1.452. These dimensions are suitable for direct coupling to single mode fiber optic waveguides at λ=1.55 µm.

The isolation (Is) and loss (L(±)) for this case are plotted against the desired thickness 30 ($t_c$) of the FPC layer 12 in the forward direction in Graph 1 below and in the backward direction in Graph 2 below. The ratio of isolation in dB/cm to loss in dB/cm is plotted against the desired thickness 30 ($t_c$) of the FPC layer 12 in Graph 3, also below. The ratio in the forward direction is shown as a solid line. The ratio in the backward direction is shown as a dashed line. As can be seen for $t_c$ in the range from 0.51 to 0.55 µm, useful forward isolation-to-loss ratios above 5 with a peak value of 13.24 are obtained. Below this range the ratio rapidly drops towards zero at $t_c$ ±0.5 µm. In the backward direction the peak value is 9 and the range for isolation-to-loss ratios above 5 is ±4.75–4.85.

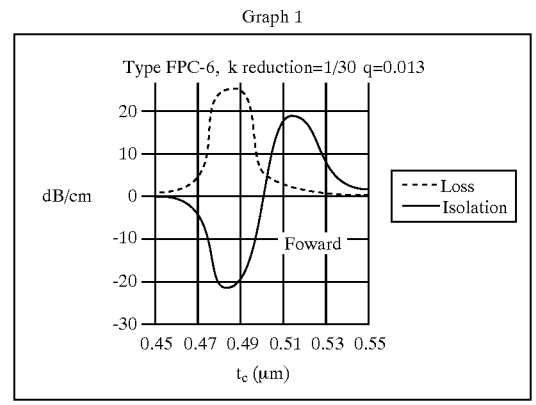

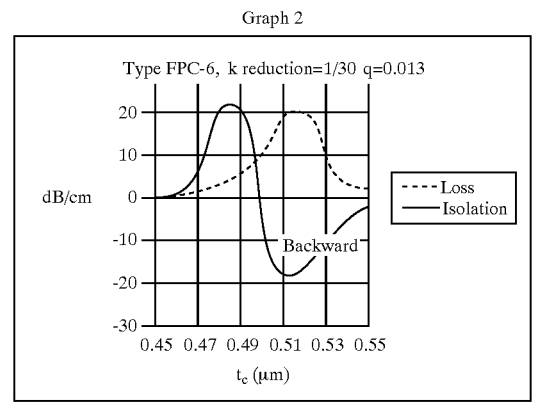

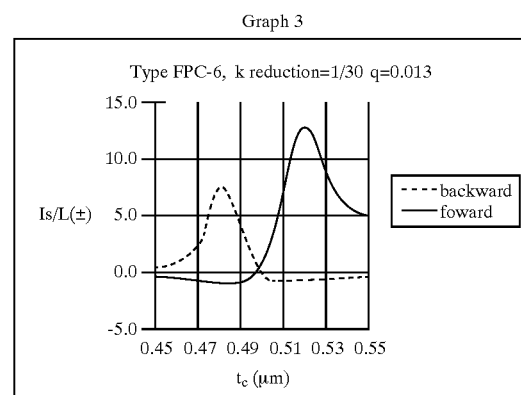

It may thus be appreciated that the correct range of thickness of the FPC layer 12 should be utilized. At the same time it may be appreciated that the actual value of $t_c$ in the desired range is generally not critical in every situation. This eases manufacturing tolerances and makes the approach of this invention practical.

The results for several more examples are summarized in Table 1 below. The present invention may also be readily adapted to make in-line optical isolators, such as the optical isolator 60 of FIG. 2, directly on fiber optic waveguides.

Referring to FIG. 1, in an optical waveguide structure, the FPC layer 12 of thickness $t_c$ is deposited or provided on the cover layer of thinned segment 14. The thickness 32 of the thinned segment 14, which may in one embodiment correspond to the cladding in a fiber-optic waveguide, is adjusted to allow some optical-field penetration into the FPC layer 12. The field penetration may be calculated by well known means. The isolation-to-loss ratio depends on the field penetration. The isolation-to-loss ratio, however, is more dependent on desired thickness 30 $t_c$ and is less dependent on thickness 32. According to one aspect of the present invention, the significant parameter is indeed the isolation-to-loss ratio as the actual value of isolation may be set by choosing the isolator length.

When the static magnetic field (H)34 is applied in the direction of the positive y axis 18, the loss and effective index for TM like waveguide modes propagating in the direction of the positive z axis 20 is different than for the propagation in the direction of the negative z axis 22. The same effect will occur for propagation in a single direction when the magnetic field is reversed. This nonreciprocal change is due to the magnetic Kerr effect. The analysis below will apply to a planar guide or a ridge-guide with a relatively wide ridge.

In FIG. 1 a typical simple planar optical waveguide is illustrated. It consists of a substrate in first clad layer 26, which may correspond to the clad of a fiber optic waveguide, a waveguide film in guide layer 16, which may correspond to the core of fiber optic waveguide cover. The refractive index of the waveguide film is higher than that of the substrate and cover layers. The thickness of the film may be chosen so that the waveguide operates in a single mode. The cover thickness is chosen to allow some guided mode field to penetrate the FPC layer 12 of thickness $t_c$ which is deposited on top of the cover. The static magnetic field 34 in the direction of the positive y axis 18 is applied to the FPC layer 12 to produce the desired nonreciprocal magnetic Kerr effect.

The optical isolator 10 may also be a much more complex structure with many layers as is known in the art. In the case of a complex optical isolator 10, the FPC layer 12 will be deposited on a top layer. The layers are chosen so that some of the optical field guided mode penetrates the FPC layer 12.

According to one aspect, the required thickness of the FPC layer 12 is found by calculating the cutoff thickness ($T_c$) of a planar waveguide consisting of a substrate with refractive index equal to the cover index of the optical isolator 10 and the guide layer 16 with the complex refractive index of the FPC layer 12. The top or cover layer is air or vacuum with refractive index of 1.0. The cutoff thickness of this simple-asymmetric waveguide is readily found using any of a number of programs which solve the equation for optical waveguides and are well known in the art. Two cutoff thickness may be found, one ($T_c$+) for the forward or positive magnetic field H(+) direction and one ($T_c$−) for the backward or negative magnetic field H(−) direction. The desired thickness range for optical isolation in the forward direction has ($T_c$−) as a lower bound and may range up to 1.5 to 2 times this value. The isolation ratio in the backward direction is generally smaller and thus less useful. In the backward direction the thickness range for isolation has ($T_c$+) as a lower bound and is more restricted in range than the preferred forward isolation. See Table 1 below for a number of cases.

The isolation-to-loss ratio is found by calculating the complex refractive index of the guided mode as a function of the waveguide parameters. The change in the imaginary part of the complex index when the direction of propagation is reversed measures the isolation. The complex refractive index of the guided mode may be calculated by many well known methods.

The complex refractive indexes, which result from the applied magnetic field 34, are used as input to waveguide calculations. These are calculated by well known methods. The fill fraction, q, of the FPC layer 12 is the volume ratio of ferromagnetic particles to plastic and may be specified. The loss of the ferromagnetic particles is reduced as compared to the bulk ferromagnetic material without reduction in the magnetic properties. The imaginary part, k, of the complex refractive index is reduced by a factor in the range $\frac{1}{30}$ to $\frac{2}{30}$ for nanometer sized (30–50 nm) metal particles. The complex constants for use in the wave equations are calculated from the dielectric constants of the plastic $\in_p$ and the ferromagnetic material $\in_m$ using the Maxwell Garnet theory. These relationships may be used to calculate the constants for any FPC composition. The input to the equations are the Faraday rotation and complex dielectric constant or complex refractive index of the ferromagnetic particles and the dielectric constant or refractive index of the plastic. Values for these constants may be found in the literature by one of ordinary skill in the art.

It should again be noted that isolation in the minus direction may also be found. That is, at a second range of $T_c$ values as discussed above, there is more loss in the forward direction than in the reverse direction. In all examples described herein, better performance is in the plus direction, but the opposite may also be achieved. Both direction combinations should be checked for any desired FPC waveguide combination and the superior of the two should generally be chosen for optimum isolator performance. As taught by this invention, the desired thickness of the FPC layer 12 for isolation in the positive direction will be different than that for the negative direction and both may be found from the cut off thickness as described earlier. Alternatively, the cut off thickness may be measured as known in the art and the measured values used to design the optical isolator 10.

Table 1 below provides various waveguide dimensions and parameters in which the FPC layer 12 may be constructed. It should be understood that Table 1 is for illustration purposes only and the present invention is in no way limited to these values, dimensions or parameters.

TABLE 1

All values are at a wavelength of 1.5 μm

| Type | Cover Index | Polymer Index | k rdctn factor | fill frctn q | Cut off Thickness (μm) | | Thckn at Max Iso-Loss Ratio | | Max Iso-Loss Ratio (dB/dB) | |
|---|---|---|---|---|---|---|---|---|---|---|
| | | | | | (Tc+) | (Tc−) | (tc+) | (tc−) | Is/L+ | Is/L− |
| FPC-1 | 1.450 | 1.452 | 1/30 | 0.100 | 0.50 | 0.57 | 0.60 | 0.54 | 13.0 | 9.0 |
| FPC-2 | 1.450 | 1.452 | 1/30 | 0.013 | 1.50 | 1.60 | 2.00 | 1.80 | 9.0 | 2.1 |
| FPC-3 | 1.450 | 1.520 | 1/30 | 0.100 | 0.40 | 0.40 | 0.47 | 0.47 | 13.6 | 0.9 |

TABLE 1-continued

All values are at a wavelength of 1.5 μm

| Type | Cover Index | Polymer Index | k rdctn factor | fill frctn q | Cut off Thickness (μm) (Tc+) | (Tc−) | Thckn at Max Iso-Loss Ratio (tc+) | (tc−) | Max Iso-Loss Ratio (dB/dB) Is/L+ | Is/L− |
|---|---|---|---|---|---|---|---|---|---|---|
| FPC-4 | 1.447 | 1.540 | 2/30 | 0.013 | 0.70 | 0.70 | 0.70 | 0.68 | 3.5 | 2.8 |
| FPC-5 | 1.447 | 1.540 | 2/30 | 0.100 | 0.35 | 0.40 | 0.46 | 0.42 | 6.1 | 6.1 |
| FPC-6 | 1.447 | 1.540 | 1/30 | 0.013 | 0.40 | 0.50 | 0.52 | 0.48 | 12.2 | 8.0 |
| FPC-7 | 1.447 | 1.540 | 1/30 | 0.100 | 0.35 | 0.40 | 0.46 | 0.42 | 12.4 | 9.0 |
| FPC-8 | 1.447 | 1.600 | 1/30 | 0.013 | 0.32 | 0.34 | 0.40 | 0.37 | 10.0 | 4.0 |

A k reduction factor of 1/30 is taken for the case where the iron particles average between 50 nm and 30 nm or less. A larger k reduction factor of 2/30 (higher loss) is taken from the case where the iron particles average above 50 nm. Compositions with two different fill factors q=0.013 and q=0.1 are included to indicate that a range of fills may be used. All the waveguides shown have a film thickness, i.e., the thickness of the guide layer 16, of 10 μm with refractive index of 1.452.

As there are many transparent polymers (also referred to as "plastics") that may be used in the FPC layer 12 and several values of polymer refractive indexes are shown for illustrative purposes. Types FPC-4 through FPC-7 may be PMMA which has refractive index of 1.54 at λ=1.55 μm. The polymer for type FPC-1 and FPC-2 is chosen to match the core index (1.452) of typical quartz based optical waveguide. Various index values may also be obtained by mixtures of polymers and other available materials.

Complex refractive indexes may be calculated as described below. The complex refractive indexes used as input to the waveguide calculations are found as follows:

The off diagonal elements of the complex premitivity tensor $\epsilon_{xz}=\epsilon_{xz1}+i\epsilon_{xz2}$ due to a saturating magnetic field is related to the Faraday rotation θF and the complex refractive index $n_c=n+ik$ by $$\epsilon_{xz1}=n\lambda\theta_F/\pi$$

$$\epsilon_{xz2}=-k\lambda\theta_F/\pi \quad (1$$

The complex dielectric constant of the ferromagnetic material $\epsilon_m=\epsilon_1+i\epsilon_2=n_m^2$ with a saturation magnetic field H(±) applied parallel to the y direction is $$\epsilon_m=\epsilon_1\pm\epsilon_{xz1}+i(\epsilon_2\pm\epsilon_{xz2}) \quad (2$$

The plus sign may be taken for propagation in the direction of the positive z axis and the minus sign for propagation in the opposite direction. Alternatively for propagation in a fixed direction the plus and minus signs apply to reversal in the polarity of H(±).

The loss coefficient a is related to the imaginary part of the delectric constant k by $$\alpha=2\pi k/\lambda \quad (3$$

Note that in our notation negative values of k and α would represent gain.

The optical waveguide field overlap is discussed next and illustrates how the field overlap in the composite layer, such as the FPC layer 12, changes as the thickness of the layer and propagation direction is varied, and the resulting effect on isolation. As an example, the FPC-6, which was described above, illustrates how the field overlap in the composite layer changes as the thickness of the layer and the propagation direction is varied, and the effect on isolation.

The loss of a guided mode due to loss in the composite layer is dependent on the fraction of the guided optical intensity that flows in the composite layer, such as the FPC layer 12. This fraction is frequently called the confinement factor of the composite layer. For brevity, the confinement factor may be referred to as Gamma(Γ). A physical picture of this fraction can be appreciated from plots of the near field intensity distribution in a traverse direction (x). Plots of the near field intensity are given in Graphs 4–7 below. The heavy solid line is for light flowing in the positive (H+) direction, i.e., in the direction along the positive z axis 20, and the thinner solid line is for light flowing in the negative (H−) direction, in the direction along the negative z axis 22. Graphs 4–7 illustrate the near field intensity in the FPC layer 12 at layer a thickness of 0.44, 0.48, 0.52 and 0.56 μm, respectively. It can be seen that the field intensity in the composite region (x≈0.5) may significantly change with direction and thickness. In Graph 4 below, where FPC layer 12 thickness is 0.44 μm, and in Graph 5 below, where FPC layer 12 thickness is 0.48 μm, the intensity in the composite is higher for H(+) than for H(−). In Graph 5, the H(+) field intensity in the composite region (x≈0.5) is more than an order of magnitude higher than that of H(−). The situation is reversed where thickness 30 ($t_c$) of the FPC layer 12 is 0.52 μm and 0.56 μm as shown in Graphs 6 and 7 below. In Graph 6, the H(−) intensity in the composite (x≈0.5) is about eight times that of the H(+) intensity. The effect of these intensity variations appears in the confinement factor and is summarized in Table 2 below. The confinement factor of the waveguide core, i.e., the guide layer 16, is included. As can be seen in Table 2 for all cases, the mode is well confined to the WG film of the guide layer 16 with Gamma values above 0.8. This means that more than 80% of the mode intensity is in the film.

Note that the loss exponent in the composite layer of the FPC layer 12 in the H(+) direction is 1.54E−2 and 2.9E-2 in the H(−) direction giving an exponent loss ratio ≈1.9. If the isolation was simply proportional to the composite loss the maximum isolation ratio would be 1.9 dB/dB in the forward direction. As shown in Table 2 Gamma changes both with direction and composite thickness as would be expected from the near field plots. Thus, an isolation ratio of 13.24 dB/dB is obtained in the H(+) direction for $t_c$ 0.52 μm. This is because Gamma in H(−) direction is ±7 times larger than Gamma H(+), which has the effect of amplifying the loss of the composite layer. At $t_c$ 0.48 μm. however, the situation is reversed. Here Gamma (+) is more than ten times larger than Gamma (−). This gives an isolation ratio in the reverse direction of 9.00 dB/dB. This illustrates the importance of the waveguide properties that may be exploited by the present invention.

Table 2 below provides various waveguide thicknesses and parameters in which the FPC layer 12 may be constructed and how such thicknesses influence the optical intensity in the FPC layer 12. More specifically, the optical intensity in the FPC layer 12 are compared for optical signals or light waves propagating in the direction along the positive z axis 20 and those propagating in the direction along the negative z axis 22. It should be understood that Table 2 is for illustration purposes only and the present invention is in no way limited to these values, dimensions or parameters.

TABLE 2

TYPE FPC-6, Fe-Polymer Composite

| Ferro Material | Wavelength | n Polymer | k reduction factor | Fill Fraction (q) |
|---|---|---|---|---|
| Fe | λ = 1.55 μm | 1.54 | 0.03 | 0.013 |

WG film of guide layer 16: n = 1.452; thickness tf = 10 μm; clad or thinned segment 14: n = 1.447; thickness s = 5.0 μm; Substrate: n = 1.447

H(+)
composite loss = exp(−2 Πkz/λ) = exp(−1.54E−2*z)

| Composite Thickness tc (μm) | GAMMA of Composite | GAMMA of WG Film | Loss dB L(+) | Isolation (Is) dB Is = L(−) | Ratio dB/dB Is/L(+) |
|---|---|---|---|---|---|
| 0.44 | 6.3E−04 | 0.93 | 0.69 | 0.55 | 0.80 |
| 0.48 | 2.3E−02 | 0.82 | 23.22 | 2.58 | 0.11 |
| 0.52 | 1.3E−03 | 0.94 | 1.39 | 18.40 | 13.24 |
| 0.56 | 3.3E−04 | 0.94 | 0.35 | 1.88 | 5.37 |

H(−)
composite loss = exp(−2 Πkz/λ) = exp(−2.9E−2*z)

| Composite Thickness tc (μm) | GAMMA of Composite | GAMMA of WG Film | L(−) dB/cm | Isolation Is = L(+) dB/cm | Ratio dB/dB Is/L(−) |
|---|---|---|---|---|---|
| 0.44 | 2.6E−04 | 0.93 | 0.55 | 0.69 | 1.25 |
| 0.48 | 1.2E−03 | 0.93 | 2.58 | 23.22 | 9.00 |
| 0.52 | 8.9E−03 | 0.91 | 18.40 | 1.39 | 0.08 |
| 0.56 | 9.2E−04 | 0.94 | 1.88 | 0.35 | 0.19 |

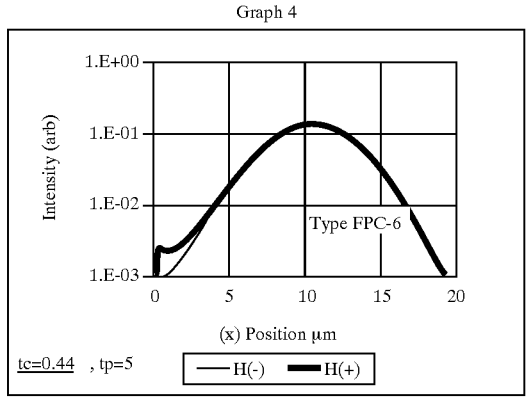

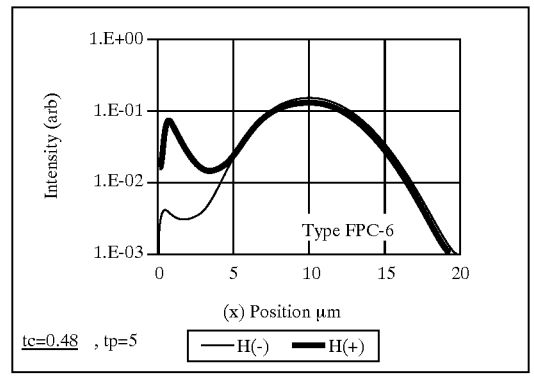

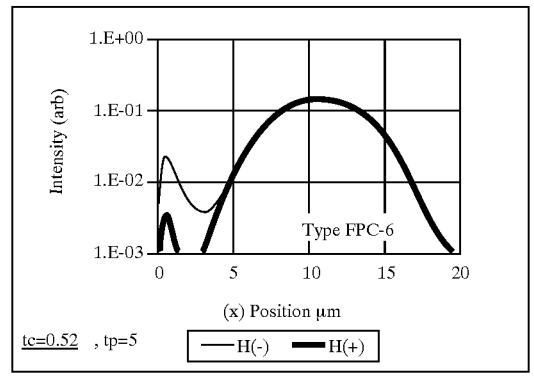

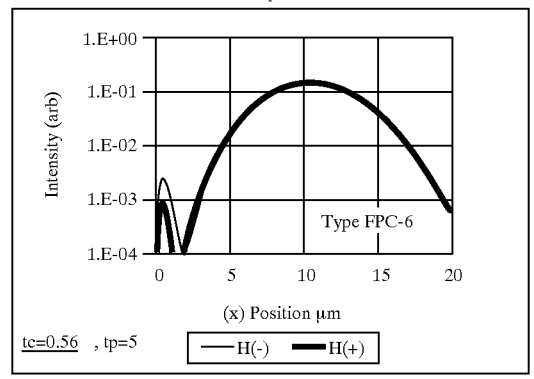

Figure 2:
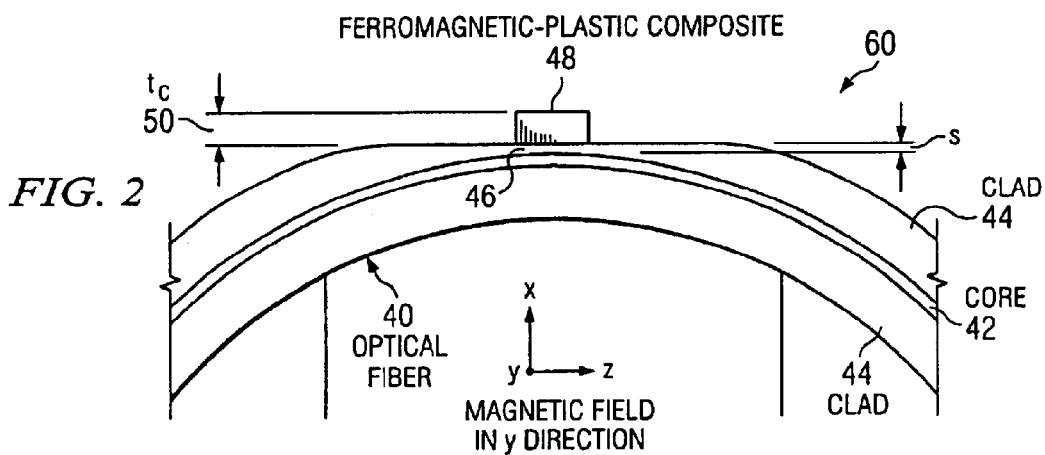
FIG. 2 is a side, cross-sectional view of an optical isolator used with or implemented using fiber optic or optical fiber waveguide that illustrates a ferromagnetic composite layer constructed in accordance with one aspect of the present invention.

FIG. 2 is a side, cross-sectional view of an optical isolator 60 that is used with or implemented using a fiber optic or an optical fiber waveguide 40, which may have, for example, a circular, a rectangular or elliptical cross-sectional area, and an FPC layer 48. Such fiber optic waveguides are well known in the art. The FPC layer 48 is used in the optical isolator 60 and is constructed in accordance with one aspect of the present invention. The optical isolator 60 consists of a static magnetic field oriented into the page of the drawing in the positive y direction, the optical fiber waveguide 40 with a core 42 surrounded by a cladding 44 having a lower index of refraction than the core 42, and the FPC layer 48 provided at a thinned segment 46 of the cladding 44 of the optical fiber waveguide 40. The applied magnetic field is positioned to act at the FPC layer 48 in the direction or orientation mentioned above. In other embodiments, the applied magnetic field may be a static magnetic field that is provided as a circumferential magnetic field, similar to a magnetic field that would be produced by a linear current running parallel to the optical fiber waveguide 40 and the FPC layer 48.

The optical fiber waveguide 40 is illustrated as being bent to facilitate trimming of the cladding 44. The thinned segment 46 of the cladding 44 is shown as thinned to a thickness s. The thickness of the thinned segment 46 of the cladding 44 is chosen to allow some guided mode field of an optical signal or light wave traveling along the core 42 to penetrate the FPC layer 48. The FPC layer 48 is illustrated having a thickness 50, which may be denoted by tc.

The thickness 50 of the FPC layer 48 is determined by calculating the cutoff thickness 50 of a planer waveguide. In one embodiment this may be achieved as described above for FPC layer 12 of FIG. 1. The planer waveguide may consist of a substrate with a refractive index equal to the cover index of the isolator and a guiding film with a complex refractive index of the FPC layer 48. The isolation-to-loss ratio is found by calculating the complex refractive index of the guided mode as a function of the waveguide parameters. The change in the imaginary part of the complex index when the direction of propagation is reversed measures the isolation. The complex refractive index of the guided modes may be calculated by many well-known methods. In the presence of a properly oriented magnetic field, and for any given set of waveguide and composite materials, an acceptable waveguide dimension will cause the overlap of the optical field in the composite layer, such as the FPC layer 48, to become dependent on the direction of propagation. That is, for propagation in one direction the overlap can be much larger than for propagation in the opposite direction. This results in a strong amplification of the effect on the waveguide mode of any change in the complex refractive index of the composite. Therefore, there is much more loss in one direction than in the reverse direction. This gives rise to a excellent isolation behavior described herein. The static magnetic field in the positive y direction that is applied to the FPC layer 48 produces the desired non-reciprocal magnetic Kerr effect.

In one aspect, maximizing the change in the complex refractive index of the composite is desirable, but may not by itself result in a good isolator. For this reason, the waveguide properties may be desirably included in determining isolator performance, and the optimum dimensions will most readily be obtained by performing the waveguide calculations over the ranges indicated herein.

The description of the present invention as provided above in connection with FIGS. 1 and 2 is an example of an optical isolator, and supporting calculations, for an optical signal that is assumed to be an optical signal with a Transverse Magnetic ("TM") like polarization mode. The present invention is equally applicable to optical signals with a Transverse Electric ("TE") like polarization mode. In fact, telecommunications lasers, which are typically used in optical telecommunications networks, generally provide an optical signal with a TE like polarization mode. The optical isolators used in such networks must, therefore, be equipped to handle such TE like polarization mode optical signals. One of ordinary skill in the art would recognize that the optical isolation calculations described above for handling TM like polarization mode optical signals could be adapted for TE like polarization mode optical signals through a simple direction or plane transformation. Similarly, structures, such as one or more FPC layers, rotated ninety degrees through a plane transformation may be used according to the present invention.

Figure 3:
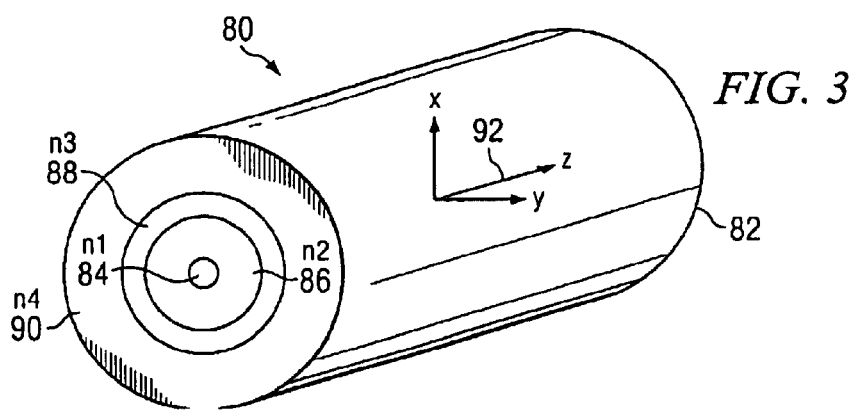
FIG. 3 is a perspective view of an optical isolator that may use an optical fiber waveguide that uses a circumferential magnetic field in accordance with another embodiment of the present invention.

FIG. 3 is a perspective view of an optical isolator 80 that may use an optical fiber waveguide 82 and that includes a circumferential magnetic field in accordance with another embodiment of the present invention. The calculations above assume a planer structure, but such calculations may be adapted to a circular structural arrangement. The optical signal that propagates through the optical isolator 80 may be, for example, an $HE_{11}$ mode optical signal, a TM like polarization mode optical signal, or, for example, a TE like polarization mode optical signal.

The optical isolator 80 includes a guide layer or core 84 to transmit an optical signal along a positive z axis 92, a cladding 86, which functions similarly to the thinned segment 46 of FIG. 2, an FPC layer 88, and a magnetic layer 90, which applies, in one embodiment, a static circumferential magnetic field around the FPC layer 88. As such, the magnetic layer 90 provides a circumferential magnetic field around the FPC layer 88 such that at least a component of the magnetic field of the magnetic layer 90 is oriented in an direction perpendicular to the positive propagation direction of the optical signal. In one embodiment, the optical isolator 80 is manufactured such that the magnetic layer 90 is integrated with the optical fiber 82.

The optical isolator 80 is similar to the optical isolator 60 of FIG. 2 except that instead of being a planer structure, the layers are circumferential. For example, the applied magnetic field, which may be a static magnetic field, produced from the magnetic layer 90 is circumferential. The FPC layer 88 is provided at a designated thickness to provide the desired optical isolation properties of the optical signal.

In operation, a TE like polarization mode optical signal may be provided through the guide layer 84 of the optical isolator 80 in the positive propagation direction along the positive z axis 92. The magnetic layer 90 provides a circumferential magnetic field around the FPC layer 88 such that at least a component of the magnetic field of the magnetic layer 90 is oriented in an direction perpendicular to the positive propagation direction of the optical signal. Just as with FIG. 2, in the presence of a properly oriented magnetic field, and for any given set of waveguide and composite materials, an acceptable waveguide dimension will cause the overlap of the optical field in the FPC layer 88, to become dependent on the direction of propagation. That is, for propagation in one direction the overlap can be much larger than for propagation in the opposite direction. This results in a strong amplification of the effect on the waveguide mode of any change in the complex refractive index of the composite. Therefore, there is much more loss in one direction than in the reverse direction. This gives rise to a excellent isolation behavior described herein. The circumferential magnetic field that is applied to the FPC layer 88 produces the desired non-reciprocal magnetic Kerr effect.

Thus, it is apparent that there has been provided, in accordance with the present invention, an inline ferromagnetic-composite isolator and method that provides improved performance and that satisfies one or more of the advantages set forth above. Although the preferred embodiment has been described in detail, it should be understood that various changes, substitutions, and alterations can be made herein without departing from the scope of the present invention, even if all of the advantages identified above are not present. For example, the various elements or components may be combined or integrated in another system or certain features may not be implemented. Also, the techniques, systems, sub-systems, layers, compositions and methods described and illustrated in the preferred embodiment as discrete or separate may be combined or integrated with other systems, modules, techniques, or methods without departing from the scope of the present invention. For example, cladding, guide, core and magnetic-composite layers, in certain embodiments of the present invention, may be implemented using multiple layers of each without departing from the present invention. Further, each such layer may be made of the same or different materials with different electrical, magnetic, and optical properties and still fall within the scope of the present invention. Other examples of changes, substitutions, and alterations are readily ascertainable by one skilled in the art and could be made without departing from the spirit and scope of the present invention.

What is claimed is:

1. An optical isolator comprising:
   a waveguide that includes:
      a core having a first end, a second end, and a boundary surface, the core operable to allow a light wave incident the first end of the core to propagate from the first end of the core to the second end of the core, which defines a positive propagation direction, and operable to allow a light wave incident the second end of the core to propagate from the second end of the core to the first end of the core, which defines a negative propagation direction, and
      a cladding provided relative the boundary surface of the core, wherein a thinned segment of the cladding having a cladding thickness operable to allow an optical field penetration through the thinned segment of the cladding by a light wave that propagates in the positive propagation direction of the core, the thinned segment operable to allow the optical field penetration through the thinned segment of the cladding by a light wave that propagates in the negative propagation direction of the core, and the thinned segment of the cladding having a length that extends relative to a portion of the core; and
   a magnetic-composite material provided in the presence of an externally applied magnetic field with at least a component of the externally applied magnetic field oriented in a direction perpendicular to the positive propagation direction of the core and parallel to the magnetic vector of the optical field, the magnetic-composite material positioned relative the thinned segment of the cladding of the waveguide to receive the optical field penetration through the thinned segment of the cladding, the magnetic-composite material having a thickness and an index of refraction to attenuate a light wave that propagates in the portion of the core in the negative propagation direction by an amount greater than the attenuation of a light wave that propagates in the portion of the core in the positive propagation direction.

2. The optical isolator of claim 1, wherein the thickness of the magnetic-composite material is an optimal thickness defined as the thickness of the magnetic-composite material where maximum attenuation occurs of a light wave of a known frequency that propagates in the portion of the core in the negative propagation direction.

3. The optical isolator of claim 1, wherein the thickness of the magnetic-composite material is an optimal thickness defined as the thickness of the magnetic-composite material where the maximum isolation-to-loss ratio occurs, where the isolation is defined as the attenuation of a light wave of a known frequency that propagates in the portion of the core in the negative propagation direction, and the loss is defined as the attenuation of a light wave of a known frequency that propagates in the portion of the core in the positive propagation direction.

4. The optical isolator of claim 3, wherein the light wave of a known frequency that propagates in the portion of the core in the negative propagation direction is a reflected light wave from the light wave of a known frequency that propagates in the portion of the core in the positive propagation direction.

5. The optical isolator of claim 3, wherein the maximum isolation-to-loss ratio is greater than one.

6. The optical isolator of claim 3, wherein the maximum isolation-to-loss ratio is greater than ten.

7. The optical isolator of claim 1, wherein the magnetic-composite material has a thickness that results in a larger optical intensity of the optical field of the light wave of a known frequency that propagates in the portion of the core in the negative propagation direction to penetrate the thinned segment of the cladding to propagate in the magnetic-composite material, than the optical intensity of the optical field of the light wave of a known frequency that propagates in the portion of the core in the positive propagation direction to penetrate the thinned segment of the cladding to propagate in the magnetic-composite material.

8. An optical isolator comprising:
   a waveguide that includes:
      a core having a first end, a second end, and a boundary surface, the core operable to allow a light wave incident the first end of the core to propagate from the first end of the core to the second end of the core, which defines a positive propagation direction, and operable to allow a light wave incident the second end of the core to propagate from the second end of the core to the first end of the core, which defines a negative propagation direction, and
      a cladding provided relative the boundary surface of the core, wherein a thinned segment of the cladding having a cladding thickness operable to allow an optical field penetration through the thinned segment of the cladding by a light wave that propagates in the positive propagation direction of the core, the thinned segment operable to allow the optical field penetration through the thinned segment of the cladding by a light wave that propagates in the negative propagation direction of the core, and the thinned segment of the cladding having a length that extends relative to a portion of the core; and
   a magnetic-composite material provided in the presence of a magnetic field with at least a component of the magnetic field oriented in a direction perpendicular to the positive propagation direction of the core and parallel to the magnetic vector of the optical field, the magnetic-composite material positioned relative the thinned segment of the cladding of the waveguide to receive the optical field penetration through the thinned segment of the cladding, the magnetic-composite material having a thickness and an index of refraction to attenuate a light wave that propagates in the portion of the core in the negative propagation direction by an amount greater than the attenuation of a light wave that propagates in the portion of the core in the positive propagation direction wherein the magnetic-composite material is made of a polymer and magnetic particles.

9. The optical isolator of claim 8, wherein the polymer is a transparent plastic.

10. The optical isolator of claim 8, wherein the magnetic particles are ferromagnetic particles.

11. The optical isolator of claim 10, wherein the ferromagnetic particles are iron.

12. The optical isolator of claim 8, wherein the magnetic particles are metal.

13. The optical isolator of claim 8, wherein the magnetic particles are dispersed throughout the polymer.

14. The optical isolator of claim 8, wherein the magnetic particles are nanometer sized particles.

15. The optical isolator of claim 8, wherein the index of refraction of the polymer is equal to or greater than the index of refraction of the cladding of the waveguide.

16. An optical isolator comprising:
   a waveguide that includes:
      a core having a first end, a second end, and a boundary surface, the core operable to allow a light wave incident the first end of the core to propagate from the first end of the core to the second end of the core, which defines a positive propagation direction, and operable to allow a light wave incident the second end of the core to propagate from the second end of the core to the first end of the core, which defines a negative propagation direction, and
      a cladding provided relative the boundary surface of the core, wherein a thinned segment of the cladding having a cladding thickness operable to allow an optical field penetration through the thinned segment of the cladding by a light wave that propagates in the positive propagation direction of the core, the thinned segment operable to allow the optical field penetration through the thinned segment of the cladding by a light wave that propagates in the negative propagation direction of the core, and the thinned segment of the cladding having a length that extends relative to a portion of the core; and
   a magnetic-composite material provided in the presence of a magnetic field with at least a component of the magnetic field oriented in a direction perpendicular to the positive propagation direction of the core and parallel to the magnetic vector of the optical field, the magnetic-composite material positioned relative the thinned segment of the cladding of the waveguide to receive the optical field penetration through the thinned segment of the cladding, the magnetic-composite material having a thickness and an index of refraction to attenuate a light wave that propagates in the portion of the core in the negative propagation direction by an amount greater than the attenuation of a light wave that propagates in the portion of the core in the positive propagation direction wherein the magnetic-composite material comprises a glass material and a plurality of magnetic particles.

17. The optical isolator of claim 1, wherein the optical isolator is provided inline with an optical fiber, the core of the optical isolator is in communication with a core of the optical fiber, and the cladding of the optical isolator is in communication with a cladding of the optical fiber.

18. The optical isolator of claim 1, wherein the core has a circular cross-sectional area that is perpendicular to the direction of propagation of the light wave that propagates in the positive direction of the core, and the cladding surrounds the core.

19. The optical isolator of claim 18, wherein the magnetic-composite material surrounds the cladding.

20. The optical isolator of claim 19, further comprising:
   a magnet that surrounds the magnetic-composite material and is operable to generate the externally applied magnetic field.

21. The optical isolator of claim 1, wherein the core has an elliptical cross-sectional area that is perpendicular to the direction of the propagation of the light wave that propagates in the positive direction of the core, and the cladding surrounds the core.

22. The optical isolator of claim 1, wherein the core has a rectangular cross-sectional area that is perpendicular to the direction of the propagation of the light wave that propagates in the positive direction of the core, and the cladding surrounds the core.

23. The optical isolator of claim 1, wherein the externally applied magnetic field is a static magnetic field.

24. The optical isolator of claim 1, wherein the length the thinned segment of the cladding is defined as the length to ensure that a light wave that propagates in the portion of the core in the negative propagation direction is attenuated by an amount greater than the attenuation of a light wave that propagates in the portion of the core in the positive propagation direction.

25. The optical isolator of claim 1, wherein the light wave is a TE like polarization mode optical signal.

26. The optical isolator of claim 1, wherein the light wave is a TM like polarization mode optical signal.

27. An optical isolator comprising:
   a waveguide that includes:
      a guide layer having a first end, a second end, a top, and a bottom, the guide layer operable to allow a light wave incident the first end of the guide layer to propagate from the first end of the guide layer to the second end of the guide layer, which defines a positive propagation direction, and operable to allow a light wave incident the second end of the guide layer to propagate from the second end of the guide layer to the first end of the guide layer, which defines a negative propagation direction,
      a first clad layer provided relative the bottom of the guide layer, and a second clad layer provided relative the top of the guide layer, wherein a thinned segment of the second clad layer having a cladding thickness operable to allow an optical field penetration through the thinned segment of the second clad layer by a light wave that propagates in the positive propagation direction of the guide layer, the thinned segment operable to allow the optical field penetration through the thinned segment of the second clad layer by a light wave that propagates in the negative propagation direction of the guide layer, and the thinned segment of the second clad layer having a length that extends relative to a portion of the guide layer; and
   a magnetic-composite material provided in the presence of an externally applied magnetic field with at least a component of the externally applied magnetic field oriented in a direction perpendicular to the positive propagation direction of the guide layer and parallel to the magnetic vector of the optical field, the magnetic-composite material positioned relative the thinned segment of the second clad layer of the waveguide to receive the optical field penetration through the thinned segment of the second clad layer, the magnetic-composite material having a thickness and an index of refraction to attenuate a light wave that propagates in the portion of the guide layer in the negative propagation direction by an amount greater than the attenuation of a light wave that propagates in the portion of the guide layer in the positive propagation direction.

28. The optical isolator of claim 27, wherein the thickness of the magnetic-composite material is an optimal thickness defined as the thickness of the magnetic-composite material where maximum attenuation occurs of a light wave of a known frequency that propagates in the portion of the guide layer in the negative propagation direction.

29. The optical isolator of claim 27, wherein the thickness of the magnetic-composite material is an optimal thickness defined as the thickness of the magnetic-composite material where the maximum isolation-to-loss ratio occurs, where the isolation is defined as the attenuation of a light wave of a known frequency that propagates in the portion of the guide layer in the negative propagation direction, and the loss is defined as the attenuation of a light wave of a known frequency that propagates in the portion of the guide layer in the positive propagation direction.

30. The optical isolator of claim 29, wherein the light wave of a known frequency that propagates in the portion of the guide layer in the negative propagation direction is a reflected light wave from the light wave of a known frequency that propagates in the portion of the guide layer in the positive propagation direction.

31. The optical isolator of claim 27, wherein the magnetic-composite material has a thickness that results in a larger optical intensity of the optical field of the light wave of a known frequency that propagates in the portion of the guide layer in the negative propagation direction to penetrate the thinned segment of the second clad layer to propagate in the magnetic-composite material, than the optical intensity of the optical field of the light wave of a known frequency that propagates in the portion of the guide layer in the positive propagation direction to penetrate the thinned segment of the second clad layer to propagate in the magnetic-composite material.

32. An optical isolator comprising:
    a waveguide that includes:
        a guide layer having a first end, a second end, a top, and a bottom, the guide layer operable to allow a light wave incident the first end of the guide layer to propagate from the first end of the guide layer to the second end of the guide layer, which defines a positive propagation direction, and operable to allow a light wave incident the second end of the guide layer to propagate from the second end of the guide layer to the first end of the guide layer, which defines a negative propagation direction,
        a first clad layer provided relative the bottom of the guide layer, and a second clad layer provided relative the ton of the guide layer, wherein a thinned segment of the second clad layer having a cladding thickness operable to allow an optical field penetration through the thinned segment of the second clad layer by a light wave that propagates in the positive propagation direction of the guide layer, the thinned segment operable to allow the optical field penetration through the thinned segment of the second clad layer by a light wave that propagates in the negative propagation direction of the guide layer, and the thinned segment of the second clad layer having a length that extends relative to a portion of the guide layer; and
    a magnetic-composite material provided in the presence of a magnetic field with at least a component of the magnetic field oriented in a direction perpendicular to the positive propagation direction of the guide layer and parallel to the magnetic vector of the optical field, the magnetic-composite material positioned relative the thinned segment of the second clad layer of the waveguide to receive the optical field penetration through the thinned segment of the second clad layer, the magnetic-composite material having a thickness and an index of refraction to attenuate a light wave that propagates in the portion of the guide layer in the negative propagation direction by an amount greater than the attenuation of a light wave that propagates in the portion of the guide layer in the positive propagation direction, wherein the magnetic-composite material is made of a polymer and magnetic particles.

33. The optical isolator of claim 32, wherein the magnetic particles are dispersed throughout the polymer and are nanometer sized.

34. The optical isolator of claim 32, wherein the index of refraction of the polymer is equal to or greater than the index of refraction of the clad layer of the waveguide.

35. The optical isolator of claim 27, wherein the thinned segment of the second clad layer is provided as part of the guide layer.

36. The optical isolator of claim 27, wherein the length the thinned segment of the second clad layer is defined as the length to ensure that a light wave that propagates in the portion of the guide layer in the negative propagation direction is attenuated by an amount greater than the attenuation of a light wave that propagates in the portion of the guide layer in the positive propagation direction.

37. The optical isolator of claim 27, wherein the magnetic-composite material is comprised of more than one layer of magnetic-composite material.

38. An optical system comprising:
    a laser operable to generate a light wave; and an optical isolator operable to receive the light wave from the laser, the optical isolator includes:
        a waveguide that includes:
            a guide layer having a first end, a second end, a top, and a bottom, the guide layer operable to receive the light wave incident the first end and to allow the light wave to propagate from the first end of the guide layer to the second end of the guide layer, which defines a positive propagation direction, and operable to allow a second light wave incident the second end of the guide layer to propagate from the second end of the guide layer to the first end of the guide layer, which defines a negative propagation direction,
        a first clad layer provided relative the bottom of the guide layer, and a second clad layer provided relative the top of the guide layer, wherein a thinned segment of the second clad layer having a cladding thickness operable to allow an optical field penetration through the thinned segment of the second clad layer by the light wave that propagates in the positive propagation direction of the guide layer, the thinned segment operable to allow the optical field penetration through the thinned segment of the second clad layer by a light wave that propagates in the negative propagation direction of the guide layer, and the thinned segment of the second clad layer having a length that extends relative to a portion of the guide layer, and
        a magnetic-composite material provided in the presence of an externally applied magnetic field with at least a component of the externally applied magnetic field oriented in a direction perpendicular to the positive propagation direction of the guide layer and parallel to the magnetic vector of the optical field, the magnetic-composite material positioned relative the thinned segment of the second clad layer of the waveguide to receive the optical field penetration through the thinned segment of the second clad layer, the magnetic-composite material having a thickness and an index of refraction to attenuate the second light wave that propagates in the portion of the guide layer in the negative propagation direction by an amount greater than the attenuation of the light wave that propagates in the portion of the guide layer in the positive propagation direction.

39. The optical isolator of claim 38, further comprising: an optical fiber operable to receive the light wave at the second end of the guide layer of the waveguide of the optical isolator, the optical fiber operable to communicate the second wave to the optical isolator at the second end of the guide layer of the waveguide of the optical isolator.

40. A method for making an optical isolator that includes a magnetic-composite material, the method comprising:
providing a waveguide that includes:
a core having a first end, a second end, and a boundary surface, the core operable to allow a light wave incident the first end of the core to propagate from the first end of the core to the second end of the core, which defines a positive propagation direction, and operable to allow a light wave incident the second end of the core to propagate from the second end of the core to the first end of the core, which defines a negative propagation direction, and
a cladding provided relative boundary surface of the core, wherein a thinned segment of the cladding having a cladding thickness operable to allow an optical field penetration through the thinned segment of the cladding by a light wave that propagates in the positive propagation direction of the core, the thinned segment operable to allow the optical field penetration through the thinned segment of the cladding by a light wave that propagates in the negative propagation direction of the core, and the thinned segment of the cladding having a length that extends relative to a portion of the core; and
providing a magnetic-composite material provided in the presence of an externally applied magnetic field with at least a component of the externally applied magnetic field oriented in a direction perpendicular to the positive propagation direction of the core and parallel to the magnetic vector of the optical field, the magnetic-composite material positioned relative the thinned segment of the cladding of the waveguide to receive the optical field penetration through the thinned segment of the cladding, the magnetic-composite material having a thickness and an index of refraction to attenuate a light wave that propagates in the portion of the core in the negative propagation direction by an amount greater than the attenuation of a light wave that propagates in the portion of the core in the positive propagation direction.

41. A method for making an optical isolator that includes a magnetic-composite material, the method comprising:
providing a waveguide that includes:
a guide layer having a first end, a second end, a top, and a bottom, the guide layer operable to allow a light wave incident the first end of the guide layer to propagate from the first end of the guide layer to the second end of the guide layer, which defines a positive propagation direction, and operable to allow a light wave incident the second end of the guide layer to propagate from the second end of the guide layer to the first end of the guide layer, which defines a negative propagation direction, and
a first clad layer provided relative the top of the guide layer, wherein a thinned segment of the first clad layer having a cladding thickness operable to allow an optical field penetration through the thinned segment of the first clad layer by a light wave that propagates in the positive propagation direction of the guide layer, the thinned segment operable to allow the optical field penetration through the thinned segment of the first clad layer by a light wave that propagates in the negative propagation direction of the guide layer, and the thinned segment of the first clad layer having a length that extends relative to a portion of the guide layer; and
providing a magnetic-composite material provided in the presence of an externally applied magnetic field with at least a component of the externally applied magnetic field oriented in a direction perpendicular to the positive propagation direction of the guide layer and parallel to the magnetic vector of the optical field, the magnetic-composite material positioned relative the thinned segment of the first clad layer of the waveguide to receive the optical field penetration through the thinned segment of the first clad layer of the waveguide to receive the optical field penetration through the thinned segment of the first clad layer, the magnetic-composite material having a thickness and an index of refraction to attenuate a light wave that propagates in the portion of the guide layer in the negative propagation direction by an amount greater than the attenuation of a light wave that propagates in the portion of the guide layer in the positive propagation direction.

42. The method of claim 41, wherein the waveguide includes a second clad layer provided relative the bottom of the guide layer.

43. An optical isolator comprising:
a waveguide that includes:
a core having a first end, a second end, and a boundary surface, the core operable to allow a light wave incident the first end of the core to propagate from the first end of the core to the second end of the core, which defines a positive propagation direction, and operable to allow a light wave incident the second end of the core to propagate from the second end of the core to the first end of the core, which defines a negative propagation direction, and
a cladding provided relative the boundary surface of the core, wherein a thinned segment of the cladding having a cladding thickness operable to allow an optical field penetration through the thinned segment of the cladding by a light wave that propagates in the positive propagation direction of the core, the thinned segment operable to allow the optical field penetration through the thinned segment of the cladding by a light wave that propagates in the negative propagation direction of the core, and the thinned segment of the cladding having a length that extends relative to a portion of the core; and a magnetic-composite material provided in the presence of an externally applied magnetic field with at least a component of the externally applied magnetic field oriented in a direction perpendicular to the negative propagation direction of the core and parallel to the magnetic vector of the optical field, the magnetic-composite material positioned relative the thinned segment of the cladding of the waveguide to receive the optical field penetration through the thinned segment of the cladding, the magnetic-composite material having a thickness and an index of refraction to attenuate a light wave that propagates in the portion of the core in the positive propagation direction by an amount greater than the attenuation of a light wave that propagates in the portion of the core in the negative propagation direction.

44. The optical isolator of claim 1, wherein the thickness of the magnetic-composite material is an optimal thickness defined as the thickness of the magnetic-composite material where the attenuation of a light wave that propagates in the portion of the core is substantially a maximum in both negative propagation and positive propagation direction at a given wavelength.

45. The optical isolator of claim 1, wherein the index of refraction changes due to a magnetic field such that a resonance condition occurs in the composite layer resulting in a greater amount of attenuation of a light wave that propagates in the portion of the core in the negative propagation direction than the attenuation of a light wave that propagates in the portion of the core in the positive direction.

* * * * *

UNITED STATES PATENT AND TRADEMARK OFFICE
CERTIFICATE OF CORRECTION

PATENT NO. : 6,760,496 B2 Page 1 of 1
DATED : July 6, 2004
INVENTOR(S) : Hammer

It is certified that error appears in the above-identified patent and that said Letters Patent is hereby corrected as shown below:

Column 13,
Line 57, after "coefficient" delete "a" and insert -- α --.

Column 23,
Line 53, before "of the guide layer" delete "ton" and insert -- top --.

Signed and Sealed this

Third Day of January, 2006

JON W. DUDAS
*Director of the United States Patent and Trademark Office*